C. D. HARPER.
ADJUSTABLE TRUCK FOR WARDROBE TRUNKS.
APPLICATION FILED SEPT. 1, 1917.

1,283,166.

Patented Oct. 29, 1918.

Witnesses
H. B. Wooden.
H. A. Mitchell

C. D. Harper.
Inventor by Chrowles,
Attorneys

UNITED STATES PATENT OFFICE.

CHARLES D. HARPER, OF FORT WAYNE, INDIANA.

ADJUSTABLE TRUCK FOR WARDROBE-TRUNKS.

1,283,166.   Specification of Letters Patent.   Patented Oct. 29, 1918.

Application filed September 1, 1917.   Serial No. 189,386.

*To all whom it may concern:*

Be it known that I, CHARLES D. HARPER, a citizen of the United States, residing at Fort Wayne, in the county of Hardin and State of Indiana, have invented a new and useful Adjustable Truck for Wardrobe-Trunks, of which the following is a specification.

The present invention relates to a truck designed especially for use in wardrobe trunks, which are difficult to open and close, especially when filled, without marring or scratching the floor, it being the object of the invention to provide a truck of the nature indicated which will permit the trunk to be readily opened and closed without injury to the floor.

A further object of the invention is the provision of a truck for trunks and the like, which is adjustable to accommodate various sizes of trunks, foldable in order that it can be compactly stored and transported, and simple, light and inexpensive in construction, yet thoroughly practical, substantial and efficient in use.

With the foregoing and other objects in view, which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention is illustrated in the accompanying drawing, wherein.

Figure 1:
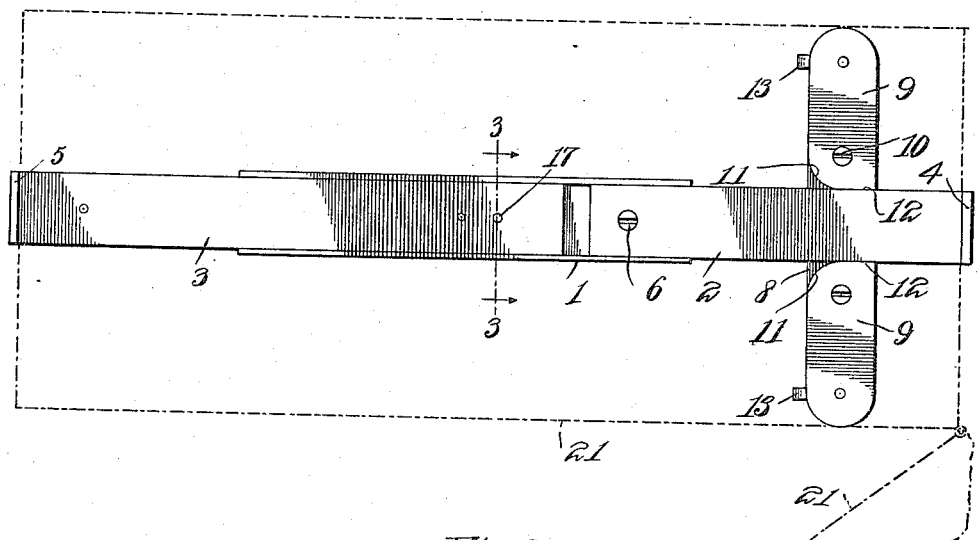
Figure 1 is a plan view of the truck, showing the trunk in dotted lines.

The truck embodies a longitudinal extensible or adjustable body comprising the intermediate section 1 of channel-shape, and the end sections or bars 2 and 3 having their adjacent ends fitting slidably within the channel member 1. The bars 2 and 3 are provided at their remote ends with upturned ears or lugs 4 and 5, respectively, to engage opposite sides of the trunk which is seated on the truck. The bar 2 is connected to the member 1 for longitudinal adjustment, to accommodate trunks of various sizes, and for this purpose a clamping bolt 6 is carried by the bar 2 near its inner end and works within a longitudinal slot 7 in the member 1, said bolt having a wing nut in order that it can be readily loosened and tightening for adjusting the truck by hand.

Figure 2:
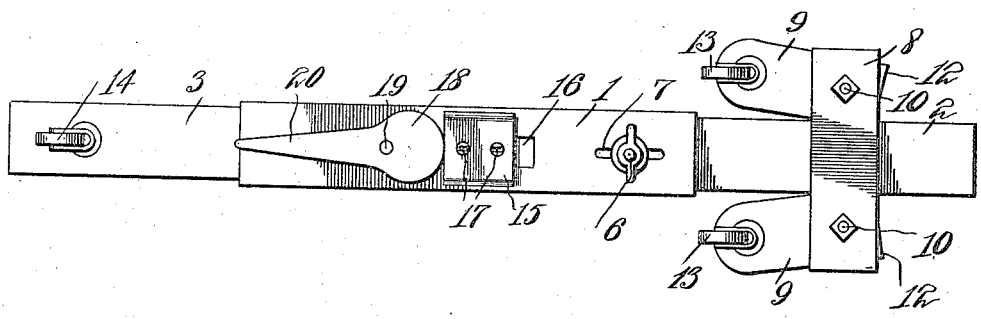
Fig. 2 is a bottom plan view of the truck in folded position.
Figure 3:
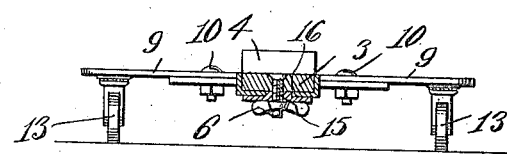
Fig. 3 is a cross section on the line 3—3 of Fig. 1.

The bar 2 has secured thereto between its ends and near its outer end, a transverse plate or member 8 projecting toward opposite sides, said member 8 being preferably at the lower side of the bar 2, and arms 9 at the opposite sides of said bar have their adjacent ends pivoted, as at 10, upon the member 8. The arms 9 have their adjacent ends curved, as at 11, so that said arms can be swung toward the opposite end of the truck against the bar 2, as seen in Fig. 2, to fold the truck, and said ends of the arms have the abutments 12 to contact with the bar 2 when said arms are swung at substantially right angles with the bar to thereby limit the movement of said arms. These arms can be swung at various angles with the bar 2, to accommodate trunks of various sizes, and when the truck is not in use, the arms can be swung against the bar 2 so that the truck will occupy but little space.

Casters 13 are pivotally connected with the arms 9 underneath the same near their free ends, and a caster 14 is carried by the bar 3 near its outer end and underneath the same whereby said casters provide a three point support for the truck to readily move on the floor.

The connection between the bar 3 and member 1 provides for the clamping of the truck to the trunk. Thus, the member 1 has a longitudinal slot 16 in which a block 15 works, said block being of inverted T-shaped cross section so as to overlap the under side of the member 1, and the block is fastened by screws 17 or otherwise with the bar 3 to move therewith. A cam 18 is pivoted, as at 19, to the lower surface of the member 1 and has a handle 20 for swinging it. In applying the truck, the same is first adjusted to the size of the trunk, by loosening the bolt 6 and adjusting the bar 2 relatively to the member 1, the cam 18 being moved to releasing position, so that the bar 3 can move away from the member 1 a short distance. Then, when the trunk is seated on the truck or the truck applied to the trunk, the bar 3 being extended, the cam 18 is then swung by means of a handle 20 and in bearing against the block 15 will force the same toward the bar 2, thereby moving the two bars toward one another, and causing the trunk to be clamped between the ears or lugs 4 and 5, thus holding the truck and trunk assembled. The arms 9 can be swung apart the desired amount to accommodate the trunk. The truck will then support the trunk and permit the same to be moved about, and opened and closed without injuring the floor.

In practice, it is preferable to use the trucks in pairs, applying one of them to each half or section 21 of the trunk, which are hinged together. Then, as the halves or sections of the trunk are swung open and closed, they can move on the floor with the trucks, one section or part of the trunk being shown in dotted lines in Fig. 1, and a fragmental portion of the other section or half being shown swung partially open.

Having thus described the invention, what is claimed as new is:

1. A truck embodying an intermediate section having a longitudinal slot therein, end sections slidable longitudinally of the intermediate section, means adjustably connecting the intermediate and one end section, a block secured to the other end section and depending through the slot, a cam lever pivotally secured to the intermediate section and engageable with the block to draw the end sections toward one another, and means on the end sections for clamping an object thereon.

2. A truck embodying an intermediate section having a longitudinal slot therein, end sections slidable longitudinally of the intermediate section, means adjustably connecting the intermediate and one end section, transversely adjustable arms on said end section, a block secured to the other end section and projecting through the slot, and means engageable with the block for drawing the end sections toward each other.

3. A truck embodying an intermediate section having a longitudinal slot therein, end sections slidable longitudinally of the intermediate section, means adjustably connecting the intermediate and one end section, means carried by said end section for clamping an article thereon, a block secured to the other end section and projecting through the slot, and means secured to the intermediate section and contacting the block to draw the end sections toward each other.

In testimony that I claim the foregoing as my own, I have hereto affixed my signature in the presence of two witnesses.

CHARLES D. HARPER.

Witnesses:
 HARRY E. BASH,
 J. A. LECHNER.